US008377147B2

(12) United States Patent
Sailor et al.

(10) Patent No.: US 8,377,147 B2
(45) Date of Patent: Feb. 19, 2013

(54) CONTROL OF MATERIALS AND POROUS MAGNETIC PARTICLES

(75) Inventors: Michael J. Sailor, La Jolla, CA (US); Ji-Ho Park, La Jolla, CA (US); Austin Derfus, Solana Beach, CA (US); Ester Segal, Haifa (IL); Kenneth S. Vecchio, San Diego, CA (US); Sangeeta N. Bhatia, Lexington, MA (US)

(73) Assignee: The Regents of the University of California, Oakland, CA (US)

( * ) Notice: Subject to any disclaimer, the term of this patent is extended or adjusted under 35 U.S.C. 154(b) by 849 days.

(21) Appl. No.: 12/300,369

(22) PCT Filed: May 16, 2007

(86) PCT No.: PCT/US2007/011727
§ 371 (c)(1),
(2), (4) Date: Mar. 23, 2009

(87) PCT Pub. No.: WO2008/027090
PCT Pub. Date: Mar. 6, 2008

(65) Prior Publication Data
US 2009/0179171 A1 Jul. 16, 2009

Related U.S. Application Data

(63) Continuation-in-part of application No. 11/632,914, filed as application No. PCT/US2005/025383 on Jul. 18, 2005, now Pat. No. 8,097,173.

(60) Provisional application No. 60/589,171, filed on Jul. 19, 2004, provisional application No. 60/800,950, filed on May 17, 2006.

(51) Int. Cl.
*B32B 15/00* (2006.01)
*B44C 1/22* (2006.01)

(52) U.S. Cl. ............ 977/962; 977/838; 977/960; 216/2; 216/22; 216/24; 216/39; 216/56; 428/357; 428/402; 428/403; 428/692.1; 435/6.1; 435/172.1; 435/173.1

(58) Field of Classification Search .................. 438/212, 438/217, 218, 402, 403, 357, 692.1; 977/838, 977/960, 962; 428/212, 217, 218, 402, 403, 428/357, 692.1; 216/2, 22, 24, 39, 5; 435/6.1, 435/172.1, 173.1
See application file for complete search history.

(56) References Cited

U.S. PATENT DOCUMENTS
4,774,265 A * 9/1988 Ugelstad et al. ................ 521/55
(Continued)

OTHER PUBLICATIONS
Atencia, J., et. al., "Controlled microfluidic interfaces", *Nature* 2005, 437, 648-655.
(Continued)

*Primary Examiner* — Nadine Norton
*Assistant Examiner* — Christopher Remavege
(74) *Attorney, Agent, or Firm* — Greer, Burns & Crain Ltd.

(57) ABSTRACT

The present invention uses externally applied electromagnetic stimulus to control and heat porous magnetic particles and material associated with the particles. The particles contain magnetic material, such as superparamagnetic iron oxide and are infused with a material. Application of a DC magnetic field allows them to be moved with their infused material, and application of an AC RF electromagnetic field allows them to be heated with their infused material. The material can be infused into pores of the particles and the particles can also adhere to an aqueous droplet. The present invention also provides a multi-layer porous magnetic particle. The particle includes a host layer having pores sized to accept magnetic nanoparticles. Magnetic nanoparticles are infused within pores of the host layer. An encoding layer includes pores that define a spectral code. The pores in the encoding layer are sized to substantially exclude the magnetic nanoparticles. The encoding layer can also be a multi-layer, exhibiting, for example, a complex spectral code.

24 Claims, 11 Drawing Sheets

U.S. PATENT DOCUMENTS

| | | | | |
|---|---|---|---|---|
| 5,512,162 | A * | 4/1996 | Sachs et al. | 205/91 |
| 5,610,274 | A * | 3/1997 | Wong | 530/334 |
| 5,734,020 | A * | 3/1998 | Wong | 530/350 |
| 6,855,426 | B2 * | 2/2005 | Yadav | 428/403 |
| 6,924,033 | B2 * | 8/2005 | Pryor et al. | 428/404 |
| 8,067,176 | B2 * | 11/2011 | Ohashi | 435/6.12 |
| 2004/0023253 | A1 * | 2/2004 | Kunwar et al. | 435/6 |
| 2005/0003098 | A1 * | 1/2005 | Kohler et al. | 427/488 |
| 2005/0014001 | A1 * | 1/2005 | Fonnum et al. | 428/403 |
| 2006/0063074 | A1 | 3/2006 | Jenson et al. | |
| 2006/0105170 | A1 * | 5/2006 | Dobson et al. | 428/403 |
| 2007/0196281 | A1 * | 8/2007 | Jin et al. | 424/9.34 |

OTHER PUBLICATIONS

Belder, D.,"Microfluidics with Droplets", *Angew. Chem. Int. Ed.* 2005, 44, 3521-3522.

Berger, P., et, al., "Preparation and properties of an Aqueous Ferrofluid", *J. Chem. Educ.* 1999; 76, 943-948.

Berry, C. C., et, al., "Functionalisation of magnetic nanoparticles for applications in biomedicine", *J. Phys. D-Appl. Phys.* 2003, 36, R198-R206.

Burns, M. A., et, al., "Microfabricated structures for an integrated DNA analysis", *Proc. Natl. Acad. Sci. U. S. A.* 1996, 93, 5556-5561.

Chan, E. M., et. al, "High-Temperature Microfluidic Synthesis of CdSe Nanocrystals in Nanoliter Droplets", *J. Am. Chem. Soc.* 2005, 127, 13854-13861.

Chen, D. L., et. al., "Using Microfluidics to Observe the Effect of Mixing on Nucleatin of Protein Crystals", *J. Am. Chem. Soc.* 2005, 127, 9672-9673.

Choi, S. H., et. al., "Micrometer-Scaled Gradient Surfaces Generated Using Contact Printing of Octadecyltrichlorosilane", *Langmuir* 2003, 19, 7427-7435.

Cui, Y., et, al., "Integration of Colloidal Nanocrystals into Lithographically Patterned Devices", *Nano Lett.* 2004, 4, 1093-1098.

Daniel, S., et. al., "Fast Drop Movements Resulting from the Phase Change on a Gradient Surface", *Science* 2001, 291, 633-636.

Delamarche, E, et. al., "Patterned Delivery of Immunoglobulins to Surfaces Using Microfluidic Networks", *Science* 1997, 276, 779-781.

DeMello, A. J., "DNA amplification moves on", *Nature* 2003, 422, 28-29.

DeMello, A. J., et. al., "Precise temperature control in microfluidic devices using Joule heating of ionic liquids", *Lab Chip* 2004, 4, 417-419.

Dorvee, J. R., et. al. "Manipulation of liquid droplets using amphiphilic, magnetic one-dimensional photonic crystal chaperones", *Nature Mater.* 2004, 3, 896-899.

Gallardo, B. S., et. al., "Electrochemical Principals for Active Control of Liquids on Submillimeter Scales", *Science* 1999, 283, 57-60.

Giordano, B. C., et. al., "Polymerase Chain Reaction in the Polymeric Microchips: DNA Amplification in Less than 240 Seconds", *Anal. Biochem.* 2001, 291, 124-132.

Gunnarsson, K.; et. al., "Programmable Motion and Separation of Single Magnetic Particles on Patterned Magnetic Surfaces". *Adv. Mater.* 2005, 17, 1730-1734.

Hamad-Schifferli, K., et. al., "Remote electronic control of DNA hybridization through inductive coupling to an attached metal nanocrystal antenna", *Nature* 2002, 415, 152-155.

Hergt, R., et. al., "Physical Limits of Hyperthermia Using Magnetite Fine Particles", *IEEE Trans. Magn.* 1998, 34, 3745-3754.

Hong, J. W., et. al., "Integrated nanoliter systems", *Nat. Biotechnol.* 2003, 21, 1179-1183.

Hosokawa, K., et. al., "Handling of Picoliter Liquid Samples in a Poly(dimethylsiloxane)-Based Microfluidic Device", *Anal. Chem.* 1999, 71, 4781-4785.

Ichimura, K., et. al., "Light-Driven Motion of Liquids on a Photoresponsive Surface", *Science* 2000, 288, 1624-1626.

Jin, R. C., et. al., "What Controls the Melting Properties of DNA-Linked Gold Nanoparticle Assemblies?", *Am. Chem. Soc.* 2003, 125, 1643-1654.

Jones, T. B., et. al., "Dielectrophoretic liquid actuation and nanodroplet formation", *J. Appl. Phys.* 2001, 89, 1441-1448.

Kalambur, V. S, et. al., "*In vitro* characterization of movement, heating and visualization of magnetic nanoparticles for biomedical applications", *Nanotechnology* 2005, 16, 1221-1233.

Kataoka, D. E., et. al., "Patterning liquid flow of the microscopic scale", *Nature* 1999, 402, 794-797.

Khandurina, J., et. al., "Integrated System for Rapid PCR-Based DNA Analysis in Microfluidic Devices", *Anal. Chem.* 2000, 72, 2995-3000.

Kopp, M. U., et. al., "Chemical Amplification: Continuous-Flow PCR on a Chip", *Science* 1998, 280, 1046-1048.

Kotz, K. T., et. al., "Optical microfluidics", *Appl. Phys. Lett.* 2004, 85, 2658-2660.

Kotz, K. T., et. al, "Optically Addressed Droplet-Based Protein Assay", *J. Am. Chem. Soc.* 2005, 127, 5736-5737.

Kricka, L., et. al., "Microchip PCR", *Anal. Bioanal. Chem.* 2003, 377, 820-825.

Lagally, E. T., et. al., "Monolithic integrated microfluidic DNA amplification and capillary electrophoresis analysis system", *Sens. Actuator B-Chem.* 2000, 63, 138-146.

Link, J. R., et. al., "Smart dust: Self-assembling, self-orienting photonic crystals of porous Si", *Proc. Nat. Acad. Sci.* 2003, 100, 10607-10610.

Meade, S. O., et. al., "Porous Silicon Photonic Crystals as Encoded Microcarriers", *Adv. Mater.* 2004, 16, 1811-1814.

Millman, J. R., et. al., "Anisotropic particle synthesis in dielectrophoretically controlled microdroplet reactors", *Nat. Mater.* 2005, 4, 98-102.

Oda, R. P., et. al., "Infared-Mediated Thermocycling for Ultrafast Polymerase Chain Reaction Amplification of DNA", *Anal. Chem.* 1998, 70, 4361-4368.

Paik, P., et. al., "Rapid droplet mixers for digital microfluidic systems", *Lab Chip* 2003, vol. 3, 253-259.

Pankhurst, Q. A, et. al., "Applications of magnetic nanoparticles in biomedicine", *J. Phys. D-Appl. Phys.* 2003, 36, R167-R181.

Pollack, M. G., et al., "Electrowetting-based actuation of droplets for integrated microfluidics", *Lab Chip* 2002, 2, 96-101.

Rabin, Y., "Is intracellular hyperthermia superior to extracellular hyperthermia in the thermal sense?", *Int. J. Hyperthermia* 2002, 18, 194-202.

Schnakenberg, U., et. al., "NH/sub 4/OH-based etchants for silicon micromachining: influence of additives and stability of passivation layers", *Sens. Actuators A-Phys.* 1991, 25, 1-7.

Schneegass, I., et. al. "Miniaturized flow-through PCR with different template types in a silicon chip thermocycler", *J. M. Lab Chip* 2001, 1, 42-49.

Selvin, P. R., "The renaissance of fluorescence resonance energy transfer", *Nat. Struct. Biol.* 2000, 7, 730-734.

Shinkai, M., "Functional Magnetic Particles for Medical Application", *J. Biosci. Bioeng.* 2002, 94, 606-613.

Takeuchi, S., et. al., "An Axisymmetric Flow-Focusing Microfluidic Device", *Adv. Mater.* 2005, 17, 1067-1072.

Thorsen, T., et. al., "Microfluidic Large-Scale Integration", *Science* 2002, 298, 580-584.

Velev, O. D, et. al., "On-chip manipulation of free droplets," *Nature* 2003, 426, 515-516.

Walker, N. J., "A Technique Whose Time Has Come", *Science* 2002, 296, 557-559.

* cited by examiner

CONTROL OF MATERIALS AND POROUS MAGNETIC PARTICLES

CLAIMS FOR PRIORITY

This application claims priority pursuant to 35 U.S.C. §119 from prior provisional application Ser. No. 60/800,950 filed May 17, 2006, and entitled Droplet Control with Porous Particles. This application claims priority pursuant to 35 U.S.C. §120 and is a continuation in part of application Ser. No. 11/632,914, filed Jan. 18, 2007, now U.S. Pat. No. 8,097, 173, issued Jan. 17, 2012, based upon PCT/US2005/025383 filed Jul. 18, 2005, and entitled Magnetic Porous Particles and Method of Making, which claimed priority from provisional application Ser. No. 60/589,171, which was filed on Jul. 19, 2004.

STATEMENT OF GOVERNMENT INTEREST

This invention was made with government support under F49620-02-1-0288 awarded by the Air Force Office of Scientific Research and under 1U54CA119335 and C037177 awarded by the National Institute of Health. The government has certain rights in the invention

FIELD

A field of the invention is microscale processes. The invention concerns control, such as manipulation and heating, of microscale quantities of materials. The invention can be used in many fields, for example, optoelectronics, encoding, the life sciences, security, product marking, food processing, agriculture, and chemical and biological detection/testing.

BACKGROUND

The control of materials in microscale quantities is of interest in a wide range of fields. Chemical and biological processes such as enzymatic assays, protein identification, and combinatorial synthesis, for example, present the problem of having microscale quantities of material that have to be controlled. The control can include capture of small quantities of an analyte, and localized, precise heating, for example. In other cases, materials have to be moved. Manipulation, including movement, of microscale quantities of materials including liquids, is also of interest in MEMs applications.

Microfluidics is a particular area of microscale material control that has drawn much attention. Typical microfluidic devices include patterned fluidic circuits having microchannels that transport microscale quantities of liquids. Such systems are contemplated for use in so-called "lab on a chip" applications.

The manipulation of discrete droplets is an alternative approach. Through independent micro-manipulation of discrete droplets, complex procedures can be carried out in a manner that directly mimics traditional bench-top protocols. Actuation of individual droplets on solid surfaces has been accomplished by a number of techniques including the use of thermocapillary effects, photochemical effects, electro-chemical gradients, surface tension gradients, temperature gradients, air pressure, structured surfaces, dielectrophoresis, and electrostatic methods.

Some techniques have been reported for manipulating freely suspended microliter or nanoliter droplets. One technique involves the electrowetting-based transport of aqueous electrolyte droplets in a silicone oil media using a two-sided open-channel planar microactuator structure. See, Pollack, et al., Lab Chip Vol. 2, pp 96-101 (2002). Another reported technique system involves water or dodecene microdroplets that float freely on a surface of fluorinated oil and electric fields are applied through an array of electrodes below the surface of the oil phase to manipulate the droplets. Velev et al, Nature Vol. 426, pp 515-516 (2003); Official Digest. Nat. Mater. Vol. 4, pp. 98-102 (2005). Asymmetric laser heating of a liquid/liquid interface between an aqueous droplet and its surrounding immiscible fluid can induce thermal Marangoni flows to move the droplet, which has been demonstrated with a protein assay. Kotz et al, *Appl. Phys. Lett*. Vol 85, pp. 2658-60 (2004)

A key requirement for many biological and chemical reactions is efficient heating of the sample. For example, the ability to perform the polymerase chain reaction (PCR) with high efficiency in microfluidic environments is critically dependent on rapid and precise heat transfer.

Many heating techniques have been developed for use in microfluidic networks and to droplets on solid surfaces. Non-zonal heating is generally accomplished using a Peltier device, a thin film heater or a laboratory hotplate. Accurate zonal heating may be achieved through the use of complex on-chip resistive heater networks, requiring additional fabrication steps. The primary restrictions associated with these heating methods are the thermal properties and mass of the heating block and the reaction chamber, which ultimately limit the rate at which the sample can be heated and cooled. The thermal mass problem can be eliminated by using non-contact heating methods to specifically heat the sample or the reaction medium. Advanced droplet-based microfluidics is especially problematic due to the required efficient localized heating of the individual droplets with minimal heat transfer to the surroundings.

Porous particles constructed from electrochemically etched porous materials, such as silicon, have widespread application in optoelectronics, chemical and biological sensors, high-throughput screening, and drug delivery applications. These porous particles are especially advantageous because of the relative ease with which the optical properties, pore size, and surface chemistry can be manipulated. Moreover, position, width, and intensity of spectral reflectivity peaks may be controlled by the current density waveform and solution composition used in the electrochemical etch, thus rendering possible the preparation of films of porous particles that display any color within the visible light band with high color saturation, which is a desirable feature for information displays.

Porous particles and films constructed from electrochemically etched porous materials have provided powerful methods for labeling and encoding. Porous particles and films and methods using porous particles and films are disclosed in 1) U.S. Published Patent Application 20050042764, entitled "Optically encoded particles" to Sailor et al., published Feb. 24, 2005; 2) U.S. Published Patent Application 20050009374, entitled "Direct patterning of silicon by photoelectrochemical etching", to Gao, et al., published Jan. 13, 2005; 3) U.S. Published Patent Application 20030146109 entitled "Porous thin film time-varying reflectivity analysis of samples," to Sailor, et al. published Aug. 7, 2003; 4) PCT Application PCT/US04/043001, entitled "Optically encoded particles, system and high throughput screening, to Sailor et al, filed Dec. 21, 2004; 5) PCT Application PCT/US04/042997, entitled "Optically encoded particles with grey scale spectra," to Sailor et al, filed Dec. 21, 2004; and 6) U.S. Published Application 2006025508, entitled, "Photonic Sensor Particles and Fabrication Methods", to Sailor, et al filed Aug. 13, 2004.

SUMMARY OF THE INVENTION

The present invention uses externally applied electromagnetic stimulus to control and heat porous magnetic particles and material associated with the particles. The particles contain magnetic material, such as super paramagnetic iron oxide and are infused with a material to be controlled. Application of a DC magnetic field allows them to be moved with their infused material, and application of an AC RF electromagnetic field allows them to be heated with their infused material. The material is infused in the particles by being contained in the pores of the particles, and the particles can also adhere to an aqueous droplet.

The present invention also provides a multi-layer porous magnetic particle. The particle includes a host layer having pores sized to accept magnetic nanoparticles. Magnetic nanoparticles are infused within pores of the host layer. An encoding layer includes pores that define a spectral code. The pores in the encoding layer are sized to substantial exclude the magnetic nanoparticles. The encoding layer can also be a multi-layer, exhibiting, for example, a complex spectral code.

BRIEF DESCRIPTION OF THE DRAWINGS

FIG. 6 shows reflectivity spectra of magnetic porous Si microparticles surrounding aqueous droplets that contain fluorophore-conjugated oligonucleotides.

DETAILED DESCRIPTION OF THE PREFERRED EMBODIMENTS

Figure 1:
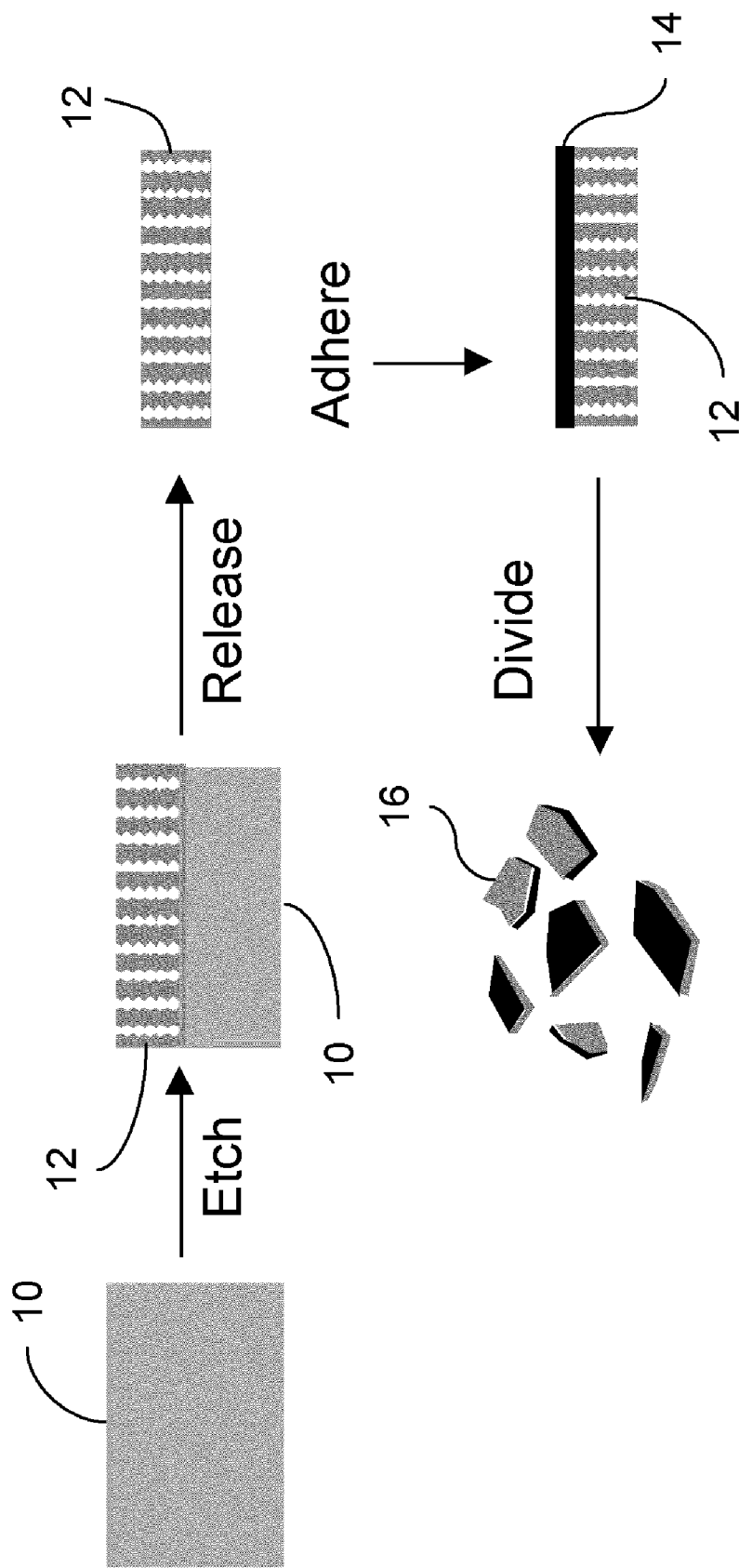
FIG. 1 illustrates a preferred method for forming magnetic porous particles according to the invention.

The present invention uses externally applied electromagnetic stimulus to control and heat porous magnetic particles and material associated with the particles. The particles contain magnetic material, such as super paramagnetic iron oxide and are infused with a material to be controlled. Application of a DC magnetic field allows them to be moved with their infused material, and application of an AC RF electromagnetic field allows them to be heated with their infused material. The material can be infused into the pores of the particles and the particles can also adhere an aqueous droplet.

The particles can deliver heat to any material that is contained in the pores of the particles or to any material to which the particles adhere. In this way, the particles themselves can act as micro-reactors to perform chemical transformations. An exemplary micro-reaction method of the invention involves application of heat via a magnetic particle to thermally cycle a PCR reaction using a very small quantity of material.

The present invention also provides a multi-layer porous magnetic particle. The particle includes a host layer having pores sized to accept magnetic nanoparticles. Magnetic nanoparticles are infused within pores of the host layer. An encoding layer includes pores that define a spectral code. The pores in the encoding layer are sized to substantially exclude the magnetic nanoparticles. The encoding layer can also be a multi-layer, exhibiting, for example, a complex spectral code.

Embodiments of the invention include the use of magnetic porous particles to surround, move, and heat aqueous droplets. The particles can deliver heat, for example, to aqueous droplets to which they adhere. Preferred methods of the invention provide generally provide for controlling, e.g., manipulating and heating, small volumes of liquids without a microfluidic container or use of a pump. The level of heating is related to the number of microparticles introduced into a host droplet, and their degree of magnetization. Thus, a group of discrete droplets can be simultaneously heated to different temperatures using a single coil. Particles can also be tracked separately. A one-dimensional photonic crystal etched into a porous particle also can provide a unique spectral code to identify a particle and its associated payload, be it material contained in its pores or a droplet to which the particle adheres.

An example method of the invention is a microfluidic application involving transport, mixing and melting (dehybridization) of a DNA duplex using FRET as an assay for the two strands hybridizing. The porous particles can be deposited with precision to permit individual fluid droplets to be controlled to reach a specific predetermined temperature. Additionally, the porous particles can be coded, permitting individual fluid droplets to be identified by a specific code, which in preferred embodiments is comparable to a bar code as bar coded porous particles can be used. Additionally, the particles can deliver a very small payload into the droplet. Embodiments of the invention permit portions of the payload to be delivered at separate times.

In vivo drug delivery is another exemplary application of the invention. For example, a loaded porous chip can deliver a payload in vivo. This is significant for therapeutic applications, where a porous chip can be implanted under the skin (IM) and then a coil placed near it (outside the body) to transmit RF energy that can heat the particle to deliver the payload. Delivery in this manner through the invention is advantageous compared to coating iron oxide particles and heating them because the chemistry is different with coated iron oxide particles. With the invention, there is no need to covalently attach a prodrug and then release it. Instead, the porous particle holds the original, formulated drug and releases it at a specific time.

Preferred embodiments of the invention make use of porous silicon particles. Encoding strategies for forming porous silicon particles can be applicable to other semiconductors and insulators. Particle encoding strategies are disclosed, for example, in U.S Published Application No. 20050042764, entitled "Optically Encoded Particles" and filed by Sailor et al. Patterning of silicon with complex patterns is disclosed in U.S. Published Application No. 20050009374, entitled "Direct Patterning of Silicon by Photoelectrochemical Etching", and filed by Gao et al. International Application, PCT/US2004/026572, entitled "Photonic Sensor Particles and Fabrication Method," discloses particles and formation methods for encoded particles having particular surface affinities, including encoded particles having one hydrophobic surface and one hydrophilic surface. Those applications are incorporated by reference herein.

A preferred embodiment method of the invention uses magnetic porous Si particles to surround, move, and heat a payload. The payload can be associated material contained in pores of the particles, or the payload can be associated aqueous droplets to which the particles adhere. Also, the particles' payload can be material contained in its pores in addition to an aqueous droplet to which the particles adhere. In preferred embodiments, the particles contain super paramagnetic iron oxide, but other magnetic particles such as rare earth metals can also be used. Application of a DC magnetic field allows the particles to be moved, and application of an AC RF electromagnetic field allows them to be heated. Experiments have been conducted to demonstrate movement and heating capabilities of the invention. In the experiments, transport, mixing and melting (dehybridization) of a DNA duplex was conducted.

Methods of the invention also provide a general technique for moving and heating small volumes of liquids without a microfluidic container or pump. The electrochemical synthesis of porous photonic crystals also allows the incorporation of spectral "bar codes," allowing the possibility of distinguishing between multiple distinct liquid drops in combinatorial libraries, and this principle has also been demonstrated experimentally. With the invention, control of a wide range of inorganic, organic, or biological molecules, mammalian cells, bacteria, etc. is possible.

An embodiment of the invention uses encoded magnetic amphiphilic porous Si microparticles to locally heat, move and identify discrete microliter-scale liquid droplets. The droplets in a system of the invention can be heated and moved individually. In addition, preferred embodiments use a one-dimensional photonic crystal etched into the porous Si particle that provides a unique spectral code to identify a droplet. As the level of heating is related to the number of microparticles and their degree of magnetization, a group of discrete droplets can be simultaneously heated to different temperatures using a single coil.

Droplet movement and heating systems of the invention overcome a requirement of conventional conductive heating schemes—thermal contact between the heating element and reaction vessel. Thus, a chemical reaction requiring temperature control can be remotely actuated. Because magnetic porous Si particles adhere to the surface of a droplet, they do not require a specific payload composition, such as a high ionic strength, to effect liquid motion. In vivo applications are contemplated, using extracorporeal application of electromagnetic fields to activate and/or release therapeutic agents from inside a droplet.

In a preferred embodiment of the invention, droplets are covered with magnetic porous microparticles, and heating is achieved by application of an external alternating electromagnetic field. Magnetic porous microparticles consisting of two layers: the top layer contains a photonic code and is hydrophobic, with surface-grafted dodecyl moieties. The bottom layer consists of a hydrophilic oxide host layer that is infused with $Fe_3O_4$ nanoparticles. The amphiphilic microparticles spontaneously align at the interface of a water droplet immersed in mineral oil, allowing movement of the droplets by application of a magnetic field. Application of an oscillating magnetic field (338 kHz, 18 A RMS in a coil surrounding the experiment) heats the super paramagnetic particles and the enclosed water droplet to temperatures >80° C. within 5 min. A simple microfluidics application is demonstrated: combining complementary DNA strands contained in separate droplets and then thermally inducing dehybridization of the conjugate. The complementary oligonucleotides are conjugated with the cyanine dye fluorophores Cy3 and Cy5 to quantify the melting/re-binding reaction by fluorescence resonance energy transfer (FRET). The magnetic porous Si microparticles are prepared as photonic crystals, containing spectral codes that allow identification of the droplets by reflectivity spectroscopy. The technique demonstrates the feasibility of tagging, manipulating (including moving), and heating small volumes of liquids without the use of conventional microfluidic channel and heating systems.

Magnetic porous particles of the invention can be fabricated from substrates of semiconductor or other suitable solid-state materials. Preferably, the substrate is a single-crystal material. A silicon (Si) crystal is a preferred substrate. Single crystal materials are preferred materials.

Embodiments of the invention provide magnetically switchable, micron-sized porous particles, and a method for fabrication of the same. More specifically, embodiments of the invention include porous particles having magnetic nanoparticles adhered thereto.

Particles of the invention are applicable to a variety of industries, including but not limited to drug discovery, biological screening, chemical screening, biological labeling, chemical labeling, in vivo labeling, security identification, signaling, displays, microfluidics and product marking. Various attributes of the particles and methods of the invention enable a wide range of applications in various industries. The small size of the particles facilitates ready incorporation into various hosts, e.g., products, test kits, assays, powders (such as explosives for identification), pastes, liquids, glass, paper, and any other host or system that can accept small particles. In vivo detection is enabled by biocompatible particles of the invention, such as silicon particles, which may then be queried, for example, through tissues using near infrared and infrared wavelengths that penetrate tissues.

Additionally, the particles of the invention have application to optical signaling and display applications. Particles of the invention provide a switchable optical display capability. The porous surface of a particle of the invention provides a strong predetermined optical response characteristic of the porosity of the material, and the magnetic surface does not. This is the basis for display or signaling. Additionally, optical response can be achieved by heating of a particle and its associated material. The optical response of an individual particle of the invention may be tailored to have a particular optical characteristic, e.g., to provide an optical response of a certain wavelength. Thus, for example, under control of a magnetic field, a particle or group of particles can be caused to produce an optical response of a particular color. Other particles, having a different photonic structure, may produce an optical response of a different color. The optical response of a particle may change in the presence of an analyte, permitting analyte detection.

Embodiments of the invention enable manipulation and heating of liquids at the microscale without necessitating the addition of ions or other impurities to the bulk liquid in order to induce transport. Liquids may also be manipulated and heated outside of traditional microfluidic structures (as well as within such structures). In a preferred embodiment magnetic porous particle of the invention, superparamagnetic nanoparticles, e.g., magnetite ($Fe_3O_4$), can be incorporated into the porous nanostructure. Preferred embodiment separate affinity particles have a first surface having a first affinity, e.g., a hydrophilic surface, and a second surface having a second affinity, e.g., a hydrophobic surface, allowing the materials to chaperone and heat microliter-scale liquid droplets by application of an external magnetic field. The optical reflectivity spectrum response of the displays a peak that serves to identify the particle and the particle-liquid interaction. Other exemplary affinities can be created by, for example, incorporating a specific antibody, oligonucleotide or ligand to provide affinity for a specific antigen, oligonucleotide, or receptor.

In a preferred embodiment, photonic crystals particles are made from porous Si are with amphiphilic properties. Magnetic nanoparticles of $Fe_3O_4$ can be incorporated into the porous nanostructure. When placed in a two-phase liquid such as dichloromethane/water, these materials will accumulate and spontaneously align at the interface. If one of the liquids exists as small droplets in the other liquid, the particles can encapsulate the droplets, allowing the materials to chaperone and heat microliter-scale liquid droplets by application of an external magnetic field. The optical reflectivity spectrum of the porous particle displays a peak that serves to identify the particle and the particle-liquid interaction.

In a preferred magnetic porous particle fabrication method of the invention, a multilayered porous dielectric mirror (Rugate filter) is first etched into a single-crystal Si substrate. The film is then hydrosilylated to generate a chemically stable hydrophobic mirror. A second Rugate filter with a different periodicity is etched into the substrate, immediately beneath the first Rugate filter. The porous crystal film is released from the substrate. The porous crystal film is then divided into micron-sized particles by ultrasonication. Magnetic particles are infused into the second filter and impart a hydrophilic character to the second layer.

A particle formed by creating a particular porosity in a material, e.g., silicon, is a foundation for a method of fabrication of a magnetic porous particle of the invention. The particular porosity will govern the nature of the optical response of a magnetic porous particle of the invention. Particles may be encoded with different optical structures. Different optical structures can be etched prior to the adhering of the magnetic nanoparticles. Processes for creating different optical structures through creating porosity are described, for example, in 1) U.S. Published Patent Application 20050042764, entitled "Optically encoded particles" to Sailor et al., published Feb. 24, 2005; 2) U.S. Published Patent Application 20050009374, entitled "Direct patterning of silicon by photoelectrochemical etching", to Gao, et al., published Jan. 13, 2005; 3) U.S. Published Patent Application 20030146109 entitled "Porous thin film time-varying reflectivity analysis of samples," to Sailor, et al. published Aug. 7, 2003; 4) PCT Application PCT/US04/043001, entitled "Optically encoded particles, system and high throughput screening, to Sailor et al, filed Dec. 21, 2004; 5) PCT Application PCT/US04/042997, entitled "Optically encoded particles with grey scale spectra," to Sailor et al, filed Dec. 21, 2004; and 6) PCT Application PCT/US04/26572, entitled, "Photonic Sensor Particles and Fabrication Methods", filed Aug. 13, 2004.

The porosity of particles of the invention can have a complex structure that enables coding, for example. With varying porosity and multiple porosities in different layers, complex codes can be encoded in the porosity of a particle of the invention. Example codes realizable through control of the porosity of a particle are disclosed in U.S. Published Patent Application 20050042764, entitled "Optically encoded particles" to Sailor et al., published Feb. 24, 2005; and PCT Application PCT/US04/042997, entitled "Optically encoded particles with grey scale spectra," to Sailor et al, filed Dec. 21, 2004.

The reflection of a laser beam impinging on particles of the invention can be used to quantify the rate of switching, with larger switching rates in smaller particles. Substantial switching rates are possible. In an exemplary experiment, switching of the particles at a rate of 175 Hz was demonstrated.

In addition to the vibration and reorientation of particles 16, magnetic field(s) may also be used to move particles 16 from one location to another, such as in a fluid medium, e.g., a microfluidic channel or a volume of liquid, and also to heat the particles and associated material. Movement of particles by application of a magnetic field can be useful, for example, in optoelectronics, chemical and biological sensors, high-throughput screening, and drug delivery applications.

Magnetic porous particles may be used to bind, heat and then release associated materials, including liquids and solids. Thus, other example applications of particles of the invention include microfluidics; transport and heating of liquids and solids using magnetic fields; controlled manipulation and heating of liquid or solid micro or nano particles; delivery, targeting, and controlled release of therapeutic and/or diagnostic reagents in a patient; high throughput screening of molecules for genomics, proteomics, drug discovery applications; and controlled manipulation and heating of liquids containing cells, proteins, or other biological systems.

Embodiments of the invention enable manipulation and heating of liquids at the microscale without necessitating the addition of ions or other impurities to the bulk liquid in order to induce transport. Liquids may also be manipulated outside of traditional microfluidic structures (as well as within such structures). In a preferred embodiment magnetic porous particle of the invention, superparamagnetic nanoparticles, e.g., magnetite ($Fe_3O_4$), can be incorporated into the porous nanostructure. Preferred embodiment separate affinity particles have a first surface having a first affinity, e.g., a hydrophilic surface, and a second surface having a second affinity, e.g., a hydrophobic surface, allowing the materials to chaperone microliter-scale liquid droplets by application of an external magnetic field. The optical reflectivity spectrum response of the displays a peak that serves to identify the particle and the particle-liquid interaction. Other exemplary affinities can be created by, for example, incorporating a specific antibody, oligonucleotide or ligand to provide affinity for a specific antigen, oligonucleotide, or receptor.

In a preferred embodiment, photonic crystals particles are made from porous Si are with amphiphilic properties. Magnetic nanoparticles of $Fe_3O_4$ can be incorporated into the porous nanostructure. When placed in a two-phase liquid such as dichloromethane/water, these materials will accumulate and spontaneously align at the interface. If one of the liquids exists as small droplets in the other liquid, the particles can encapsulate the droplets, allowing the materials to chaperone and heat microliter-scale liquid droplets by application of an external magnetic field. The optical reflectivity spectrum of the porous particle displays a peak that serves to identify the particle and the particle-liquid interaction.

Preferred embodiments of the invention will now be discussed with respect to the drawings. Experiments and experimental data will also be discussed. Artisans will appreciate broader aspects and additional features of the invention from the description of the preferred embodiments and the experiments and experimental data.

A preferred method of formation and a porous magnetic particle of the invention are illustrated in FIG. 1. A substrate 10, e.g., silicon or another semiconductor, is etched by a sinusoidal anodic etch. The etch is controlled to produce a crystal film 12 having a porosity having a characteristic optical response. The porous film 12 is released from the substrate 10. The release can be achieved, for example, by application of a current pulse. Magnetic nanoparticles 14, such as Fe nanoparticles commercially available from Nanomat, Inc. of North Huntingdon, Pa., are adhered to one side of the porous film 12. Upon drying, the magnetic nanoparticles 14 adhere sufficiently to the porous film 12. The film is then divided, for example by fracturing, into small magnetic porous particles 16. The particles 16 have, on one side, the porous film surface 12 and, on the other side, the magnetic material 14.

The magnetic porous particles 16 have microscopic dimensions. Preferred embodiment particles are formed from silicon, which is a biocompatible material, have a magnetic coating of Fe. This results in a magnetic coating on one side, which exhibits an insubstantial optical response, and a porous film on the other side, which exhibits a strong optical response, e.g., an intensely colored optical response. Other magnetic materials may also be used, e.g., rare earth magnetic materials, gadolinium, or nickel.

Figure 2:
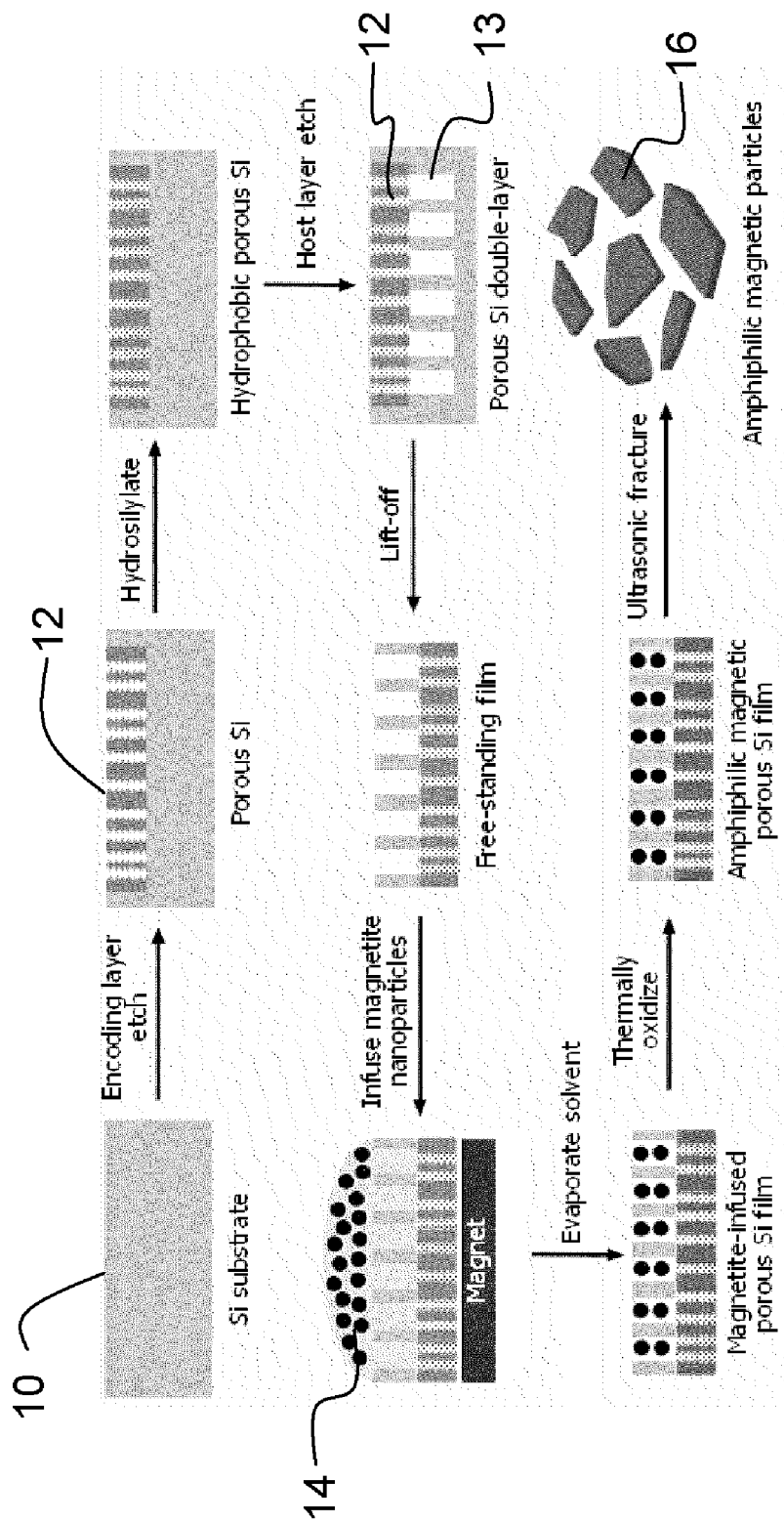
FIG. 2 illustrates another preferred method for forming magnetic porous particles according to the invention.

FIG. 2 shows another preferred method for providing a magnetic particle. In the method of FIG. 2, the particle created is a multi-layer amphiphilic magnetic silicon particle. Separate layers contain magnetic material and a material to be controlled. A spectral bar-code encoding layer 12 is first etched into the single-crystal Si substrate. The porous Si film is then hydrosilylated to generate a chemically stable hydrophobic layer. A porous host layer 13 for magnetite loading is then etched into the substrate immediately beneath the encoding layer. The entire structure is then removed from the substrate by application of a current pulse. Magnetic nanoparticles 14 are loaded into the porous host layer 13 to magnetize the host layer followed by thermal oxidation at low temperature to impart hydrophilic character to the magnetic layer. Infusion of the magnetic nanoparticles can be assisted with a magnet to draw the nanoparticles 14 into the host layer 13 from a solvent. Finally, the magnetic film is placed in acetone and fractured into micrometer-sized particles 16 by brief ultrasonication.

The host layer 13 accommodates magnetic nanoparticles, which are infused into the host layer as described. Experiments have demonstrated that the encoding layer, on the other hand, excludes the magnetic nanoparticles. Thus, coding is retained in the encoding layer. Additionally, the encoding layer can play host to associated materials to be controlled, if the materials are small enough to be accommodated within its pores. An embodiment of the invention is the porous magnetic particle have the host layer 13 that is sized to accept and infused with magnetic nanoparticles. An encoding layer is sized to exclude the magnetic nanoparticles to retain its code.

Figure 3:
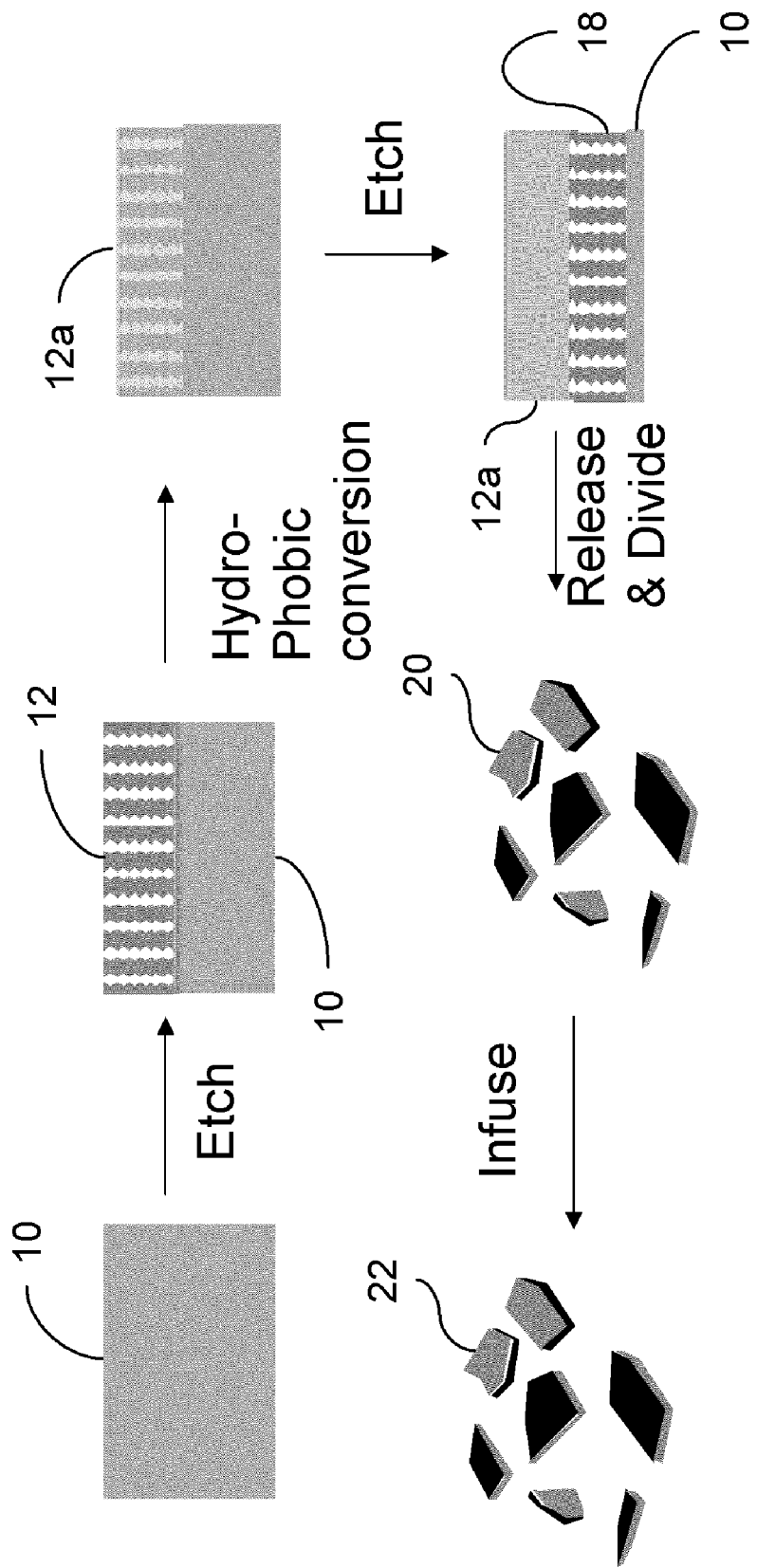
FIG. 3 illustrates another preferred method for forming magnetic porous particles according to the invention.
Figure 4:
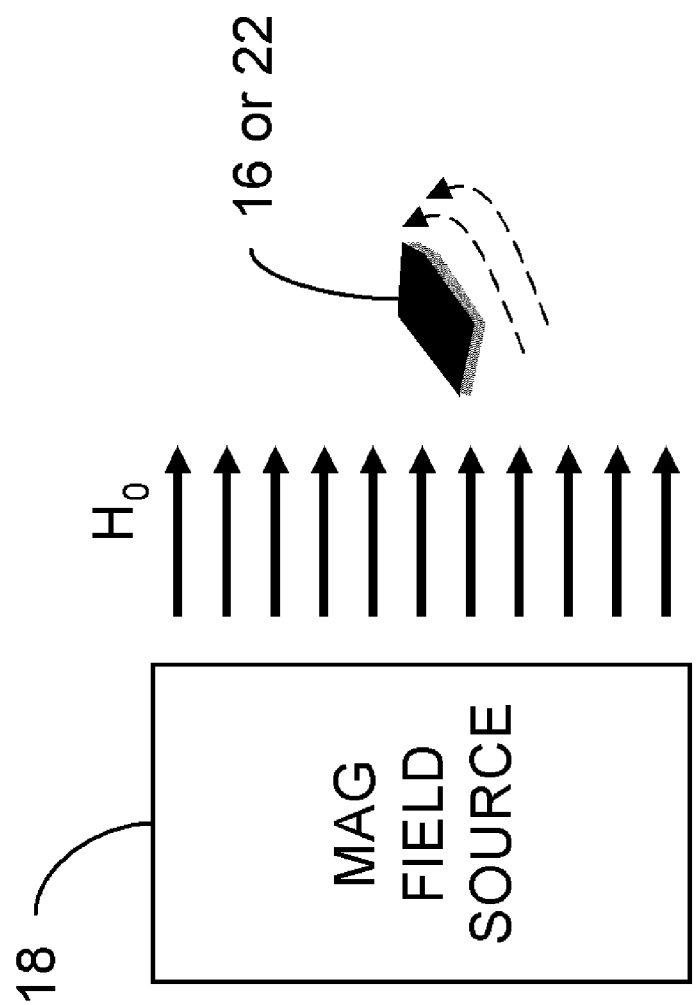
FIG. 4 illustrates a preferred method for manipulating magnetic porous particles according to the invention.

FIG. 3 shows another preferred method for providing a magnetic particle. FIG. 3 shows a preferred embodiment method of formation of magnetic porous particles with separate affinities. The process begins as the process do the processes in FIGS. 1 and 2, and like reference numerals will be used to indicated like elements in FIG. 5. A substrate 10, e.g., silicon or another semiconductor, is etched by a sinusoidal anodic etch. The etch is controlled to produce a crystal film 12 having a porosity having a characteristic optical response. In a preferred embodiment, the etch is carried out to achieve a sinusoidal variation in refractive index that results in a Rugate filter, which produces a sharp resonance feature in the optical reflectivity spectrum of the film, whose wavelength is determined by the periodicity and current limits used in the etch. The film 12 is then made to have a first affinity, e.g., by thermally hydrosilylating with 1-dodecene, generating a modified film 12a that is a to chemically stable hydrophobic mirror. A second etch is carried out to form a second porous crystal film 18 having a different periodicity from the first film 12a. In a preferred embodiment, the etch is conducted such that the film 18 forms a second rugate filter, immediately beneath the first. Releasing and dividing the films 12a, 18 from the substrate 10 forms particles 20, having a porous crystal side that has a first affinity, e.g. is hydrophobic (in accordance with properties of the film 12a), and a side that has a second affinity, e.g. is hydrophilic (in accordance with the properties of the film 18). Magnetic nanoparticles are then infused into the one of the sides, e.g., side 20 of the particles to create magnetic porous particles 22 that have the separate affinities. Preferred embodiment separate affinity particles have a first surface having a first affinity, e.g., a hydrophilic surface, and a second surface having a second affinity, e.g., a hydrophobic surface, allowing the materials to chaperone and heat microliter-scale liquid droplets by application of an external magnetic field. The optical reflectivity spectrum response of the displays a peak that serves to identify the particle and the particle-liquid interaction. Other exemplary affinities can be created by, for example, incorporating a specific antibody, oligonucleotide or ligand to provide affinity for a specific antigen, oligonucleotide, or receptor.

The magnetic porous particles 16, 22 have microscopic dimensions. Preferred embodiment particles are formed from silicon, which is a biocompatible material, have a magnetic coating or infusion of Fe. This results in a magnetic coating or infusion on one side, which exhibits an insubstantial optical response, and a porous film on the other side, which exhibits a strong optical response, e.g., an intensely colored optical response. Other magnetic materials may also be used, e.g., rare earth magnetic materials, gadolinium, or nickel.

FIG. 3 illustrates an example method for manipulation of magnetic porous particles 16 of the invention. A magnetic porous particle 16 (or particles) of the invention is placed in an oscillating magnetic field created by a magnetic field source 18. The oscillating magnetic field $H_0$ causes the small particle 16 to vibrate, and at predetermined values of magnetic field strength and oscillation frequency, the porous particles can be induced to reorient, i.e., flip over to juxtapose the position of the magnetic side and the porous side of the particle 16. If the field $H_0$ is an AC radio frequency (RF) electromagnetic, the particles and an associated material can be heated. With a DC magnetic field particles and associated materials can be moved.

The reflection of a laser beam impinging on particles of the invention can be used to quantify the rate of switching, with larger switching rates in smaller particles. Substantial switching rates are possible. In an exemplary experiment, switching of the particles at a rate of 175 Hz was demonstrated.

In addition to the vibration, heating and reorientation of particles 16, magnetic field(s) may also be used to move particles 16 from one location to another, such as in a fluid medium, e.g., a microfluidic channel or a volume of liquid, and to heat the particles, as has been described. Movement of particles by application of a DC magnetic field can be useful, for example, in optoelectronics, chemical and biological sensors, high-throughput screening, and drug delivery applications.

Magnetic porous particles may be used to bind and then release materials, including liquids and solids. Thus, other example applications of particles of the invention include microfluidics; transport of liquids and solids using magnetic fields; controlled manipulation of liquid or solid micro or nano particles; delivery, targeting, and controlled release of therapeutic and/or diagnostic reagents in a patient; high throughput screening of molecules for genomics, proteomics, drug discovery applications; and controlled manipulation of liquids containing cells, proteins, or other biological systems.

The formation method of FIGS. 1-3 have been demonstrated with experiments. Experiments have been conducted to demonstrate the control, including heating of material associated with the particles. The experiments with multiple layer particles of the invention formed in accordance with FIG. 2 will be described herein. The experiments were conducted with porous silicon particles, but artisans will understand the general applicability to other semiconductors and insulators. Also, while specific magnetic materials were used and specific associated materials were controlled and heated, the invention is not limited to the specific materials and associated materials. Various magnetic materials can be held with the pores of particles. Additionally, any material that can be associated with the particles, either by introduction into the particles' pores or by the particles' adherence to the material can be controlled and heated.

Experiments and Specific Example Embodiments

A magnetite ($Fe_3O_4$) colloidal suspension with a mean particle size of 10 nm (measured by Transmission Electron Microscopy) was prepared The magnetite suspension was mixed with acetone at a ratio of 1:3 (v/v). The concentration of the final magnetite suspension was approx. 1 mg/mL. A porous Si film (with its host layer side facing up) was placed in the center of an aluminum weighing dish and a strong magnet was located under the dish. A volume of 0.5 mL of the magnetite nanoparticle suspension was added on top of the film. When the solution evaporated, the magnetized film was rinsed thoroughly with ethanol and acetone several times and then dried in air. The film was then thermally oxidized at 100° C. overnight. The thermally oxidized film was fractured to micron-sized particles by ultrasonication (20 s) in acetone. The resulting magnetic porous Si microparticles were rinsed with ethanol and acetone several times and then filtered using a 100 μm filter to remove free magnetite nanoparticles and small aggregates. The magnetized porous Si particles were separated from the non-magnetized particles with a NdFeB rare earth magnet (National Imports NSN0550, 3.18 mm diameter and 25.40 mm length, grade N40). The final size of the magnetic porous Si microparticles was 150-200 μm.

Magnetic properties were investigated using a Quantum Design MPMS2 SQUID magnetometer with fields up to 5000 Oe at 300 K. Measurements were performed on magnetite nanoparticles, porous Si particles, and magnetite-infused porous Si particles. The amount of magnetite nanoparticles infused into the porous Si host layer was quantified by dissolving the host matrix in an aqueous solution containing 5M NaOH and ~10% ethanol at room temperature overnight. The residue was filtered, dried, and weighed. It was assumed that the residue is composed of an agglomeration of magnetite nanoparticles. Three samples were used for the dissolution tests and the measurements were averaged. These numbers were then compared with the magnetometer results.

Measurement of Interferomeric Reflectance Spectra

Interferometric reflectance spectra of encoded magnetic porous Si microparticles surrounding an aqueous droplet immersed in oil were collected using an Ocean Optics CCD S-2000 spectrometer fitted with a microscope objective lens coupled to a bifurcated fiber optic cable. A tungsten light source was focused (spot size approx. 1 mm$^2$) onto the magnetic porous Si microparticles located at the droplet/oil interface. Reflectivity data were recorded in the wavelength range 400-1000 nm, with a spectral acquisition time of 100 ms. Both illumination of the surface and detection of the reflected light were performed along an axis coincident with a vector normal to the droplet/oil interface.

Radiofrequency Electromagnetic Field-Induced Heating

Alternating electromagnetic fields were generated by applying an alternating current to a coil with 2 turns and a cross section of ~70 mm$^2$. The coils were wrapped around a Petri dish containing the aqueous droplets suspended in oil. The Petri dish had a depression in its center in order to fix the droplet in one place. A power supply (Ameritherm Nova 3) was used to apply alternating electromagnetic fields resonating at 338 kHz. Maximum power (3 kW) was used for most experiments (equivalent to 18 Amps RMS through the coil). During the experiments, cooling water (15° C.) was circulated through the coil to avoid overheating of the coil. The temperature within the droplet was measured using a metallic K-type thermocouple probe, inserted immediately after the coil power was switched off.

Fluorescence Resonance Energy Transfer (FRET) Assay

All fluorophore-conjugated DNA oligonucleotides for the FRET assay were obtained from Integrated DNA Technologies, Inc. The sequence of the Cy3-conjugated oligonucleotide was 5° Cy3 TGA TTC AAG CCG ACT 3', and the Cy5-conjugated oligonucleotide was 5' AGT CGG CTT GAA TCA Cy5 3'. The melting temperature for the pair was calculated to be 46.8° C. in 50 mM NaCl.

Droplet #1 (D1) contained 0.6 mmole of Cy3-oligonucleotides in a volume of 25 μL of buffer solution and was partially covered with the "one peak"-encoded magnetic porous Si microparticles (~2 mg). Droplet #2 (D2) contained 0.6 nmole of Cy5-oligonucleotides in a volume of 25 μL of buffer and was covered with the "three peak"-encoded magnetic porous Si microparticles (~2 mg). The aqueous buffer used in the droplets contained ultra-pure water (Sigma-Aldrich) and Dulbecco's phosphate buffered saline (DPBS without calcium and magnesium, Sigma-Aldrich) with a composition of 54.4 mM NaCl, 1.1 mM KCl, 3.2 mM $Na_2HPO_4$ and 0.6 mM $KH_2PO_4$. These encoded droplets were placed in mineral oil (Sigma-Aldrich) within the experimental dish. Using a magnet, the Cy3 droplet was moved and merged with the Cy5 droplet located in the center of the experimental dish. The mixed droplet, partially covered with the magnetic porous Si microparticles (~4 mg), was heated in 0.5 mL of mineral oil with an alternating electromagnetic field (3 kW) while the photoluminescence spectrum was monitored for FRET.

Fluorescence Measurements

The steady-state photoluminescence (PL) spectra of FRET from the droplet were obtained with an Acton 0.275 m monochromator, 500 nm-cutoff filter, and a UV-enhanced liquid nitrogen-cooled, charge-coupled device (CCD) detector (Princeton Instruments) fitted with a microscope objective lens coupled to fiber optic cable. Blue light with an emission wavelength range of 470±20 nm (150 watts, Illumatool Bright Light System LT-9900, Lightools Research) was used as the excitation source and routed through two flexible fiber-optic cables. The light source and detector lens were located at a distance of ~12 cm from the top of the droplet to prevent any heat generation in the metallic materials of the detector and light source. Fluorescence measurements were obtained normal to the droplet/dish (with the two excitation sources at ~45 degrees from normal), and integrated for 2 s.

The relationship between temperature and fluorescence measured using RF field-induced heating was compared with that observed when the droplet/oil apparatus was heated with a laboratory hotplate. The experimental dish containing the FRET probe-loaded droplet described above was placed on top of a 100 mL beaker of water and heated to 60° C. The hotplate was removed and fluorescence spectra were obtained at 1° C. intervals as the droplet cooled to 35° C. The beaker containing 100 mL of water was used as a heat reservoir to slow the cooling rate to approximately 0.5° C. per minute. Temperature of the droplet was monitored continuously with a thermocouple probe.

Preparation and Characterization of Magnetized Amphiphilic Porous Si Microparticles The synthesis scheme followed to produce magnetic amphiphilic porous Si microparticles is described with respect to FIG. 2. In the experiments the encoding layer 12 was formed as a multilayered porous Si dielectric mirror in a (100) face of a single-crystal, p-type Si wafer using a temporally modulated current waveform. The variation in refractive index resulting from the modulated etch produces sharp resonance features in the optical reflectivity spectrum of the film, whose wavelengths are determined by the characteristic frequency components of the modulated current waveform. The film was then thermally hydrosilylated with 1-dodecene, to generate a chemically stable hydrophobic layer. The host layer 13 for magnetite nanoparticles, is etched into the substrate immediately beneath the encoding layer with etching conditions that were optimized to create relatively large and cylindrically-shaped pores to accommodate the magnetite nanoparticles with a mean size of 10 nm. Electron microscope images revealed an average pore size of ~50 nm for the host layer while the pore size of the encoding layer is less than 10 nm.

After etching, the double-layered structure was removed from the Si substrate by application of a current pulse. The host layer was infused with magnetite ($Fe_3O_4$) nanoparticles. The magnetite concentration within the porous Si particles is critical not only to allow manipulation of the droplets but also to allow efficient heat generation when subjected to an alternating electromagnetic field. A highly concentrated acetone dispersion of magnetite nanoparticles (mean particle diameter of 10 nm[35]) is infiltrated into the host layer using a strong rare-earth magnet located under the porous Si film. The solvent is then evaporated while the sample is maintained in the magnetic field. Inclusion of the surfactant tetramethyl ammonium hydroxide (TMAOH) present in the magnetite nanoparticle dispersion may further enhance the infusion and entrapment of the magnetite nanoparticles within the structure by slightly etching the porous Si host layer. The use of magnetism and interfacial capillary forces generated during evaporation. The encoding layer is protected from chemical attack by the passivating dodecene surface modification step.

The magnetite infiltration step is followed by thermal oxidation to further trap the nanoparticles in the Si matrix. Thermal oxidation preferentially produces oxide on the more reactive, hydrogen-terminated host layer compared with the chemically stable, hydrosilylated encoding layer. The oxide imparts hydrophilic character to the layer, whereas the hydrosilylated side retains its hydrophobic nature, allowing the particles to align at an aqueous/organic liquid interface. The infiltration of magnetite (iron oxide) nanoparticles in the porous Si host layer is confirmed by energy dispersive X-ray spectroscopy (EDS). An elemental line scan for iron and oxygen obtained along the cross-section of a magnetic porous Si micoparticle revealed a sharp concentration gradient of iron and oxygen, with a maximum concentration close to the outer surface of the host layer. The thickness of an example porous Si layer containing iron is approx. 10 µm. This layer was observed as a bright region in the backscattered-electron image, due to the large difference in atomic number between iron and the other constituents of the film (silicon, oxygen, carbon, hydrogen, and the boron dopant for p-type silicon). Thus, the magnetite nanoparticles are solely infused into the large pores of the host layer and not in the encoding layer. The backscattered-electron image of the encoding layer displays an alternating contrast pattern, arising from the density modulation produced by the periodic current waveform used in its preparation.

Figure 5:
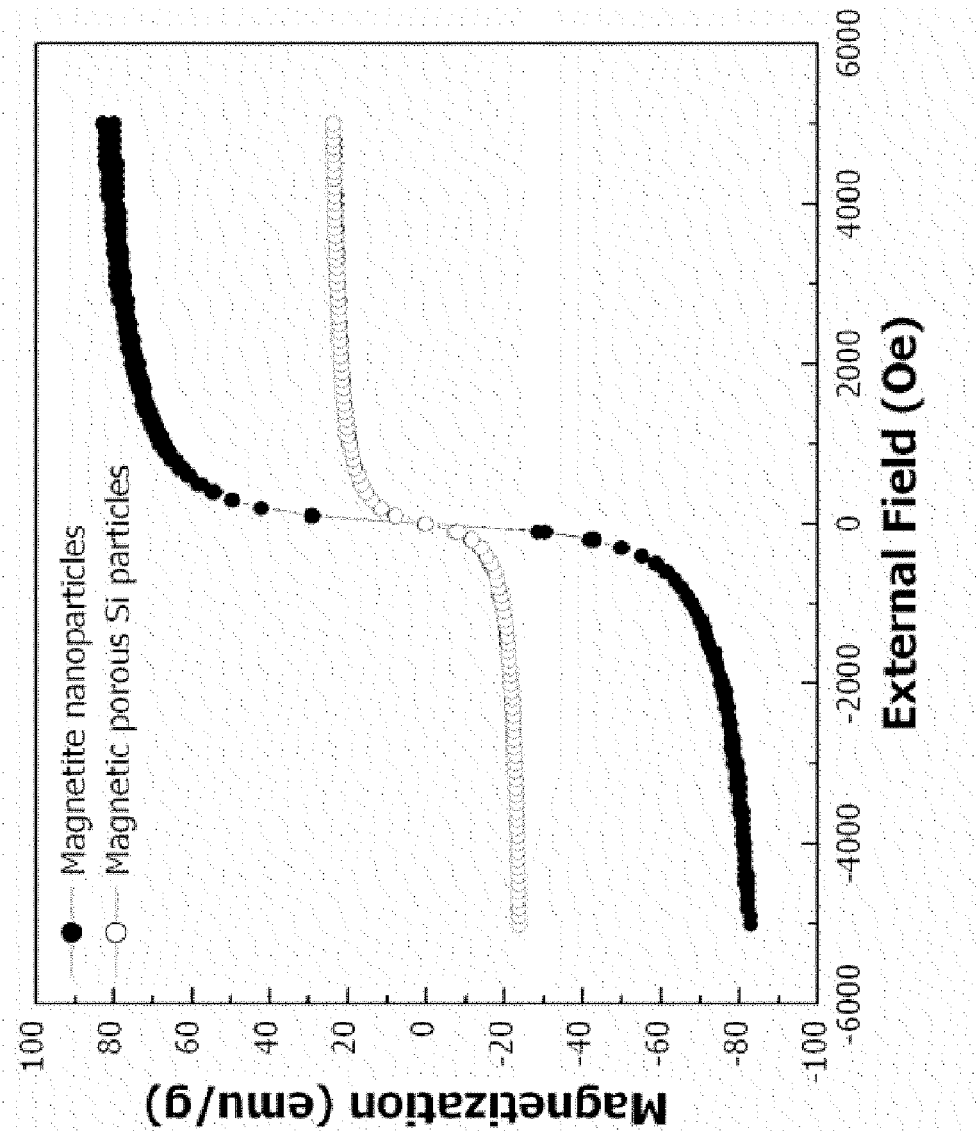
FIG. 5 shows room-temperature magnetization curves of magnetite ($Fe_3O_4$) nanoparticles (●) and magnetite-infused porous Si microparticles (○)

The magnetic properties of the porous Si microparticles were studied at room temperature by SQUID magnetometry and the results are shown in FIG. 5. FIG. 5 shows the room-temperature magnetization curves of magnetite ($Fe_3O_4$) nanoparticles (●) and magnetite-infused porous Si microparticles (○). The magnetic porous Si microparticles display superparamagnetic behavior similar to magnetite nanoparticles, although the porous Si microparticles exhibit lower saturation magnetization on a per-gram basis due to the presence of diamagnetic porous Si. The magnetization curve of magnetite-infused porous Si microparticles shows superparamagnetism similar to pure magnetite nanoparticles. The saturation magnetization of the magnetic porous Si microparticles is lower than that of the pure magnetite nanoparticles due to the lower concentration of magnetite nanoparticles in the diamagnetic porous Si matrix. To test this assertion, magnetite loading within the porous Si particles was determined by dissolving the porous Si host particles in ethanolic 5 M NaOH solution and weighing the residue. This gravimetric determination yields a weight percent of magnetite nanoparticles in the microparticles of ~32%. This result is consistent with the SQUID data, which indicate magnetite content of ~29 wt % (calculated from the magnetization saturation values, FIG. 5).

Figures 6A, 6B:
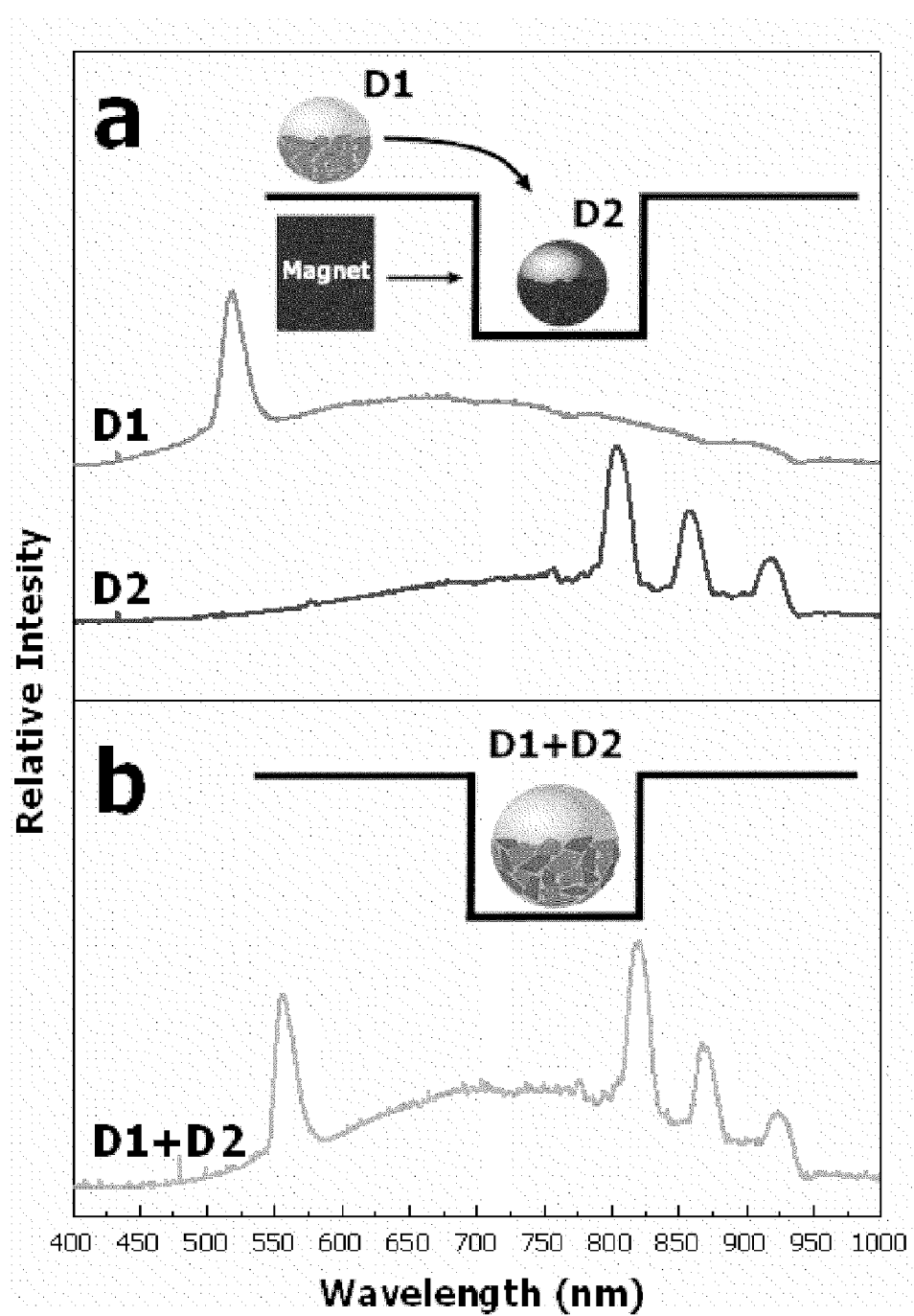
FIG. 6A shows reflectivity spectra obtained from the particles half-covering droplet 1 (D1), which contain Cy3-conjugated oligonucleotides, and the particles half-covering droplet 2 (D2), containing Cy5-conjugated oligonucleotides.
FIG. 6B shows the reflectivity spectrum obtained after merging D1 and D2.

In experiments, different spectral codes were used to identify each of the two droplets containing a component of the FRET probe. Droplet 1 (D1) contains Cy3-conjugated oligonucleotides and the magnetic porous Si particles surrounding this droplet are characterized by a single spectral reflectance peak (FIG. 6A). Droplet 2 (D2) contains the Cy5-labeled oligonucleotides and is coated with particles characterized by a three-peak spectral code (FIG. 6B). The droplets were half-covered with magnetic porous Si particles in order to allow detection of the fluorescence from a FRET probe contained in the droplet using a cooled CCD detector, which will be discussed in the next section. The two droplets are merged by moving droplet 1 into a shallow well containing droplet 2 by means of a small rare-earth permanent magnet (FIG. 6A). After droplet fusion, the spectral code recorded from the particles covering the mixed droplet contains four peaks, resulting from a combination of the spectrum of the particles surrounding droplet 1 (one peak) and 2 (three peaks), FIG. 6B. The spectral 'barcodes' incorporated in the magnetic porous Si microparticles allow different droplets to be interrogated and identified in an ensemble of droplets. This approach is expected to be especially useful for performing complex bioassays containing multiple distinct liquid droplets and may be further developed with programmable control on a patterned magnetic surface.

Figure 7:
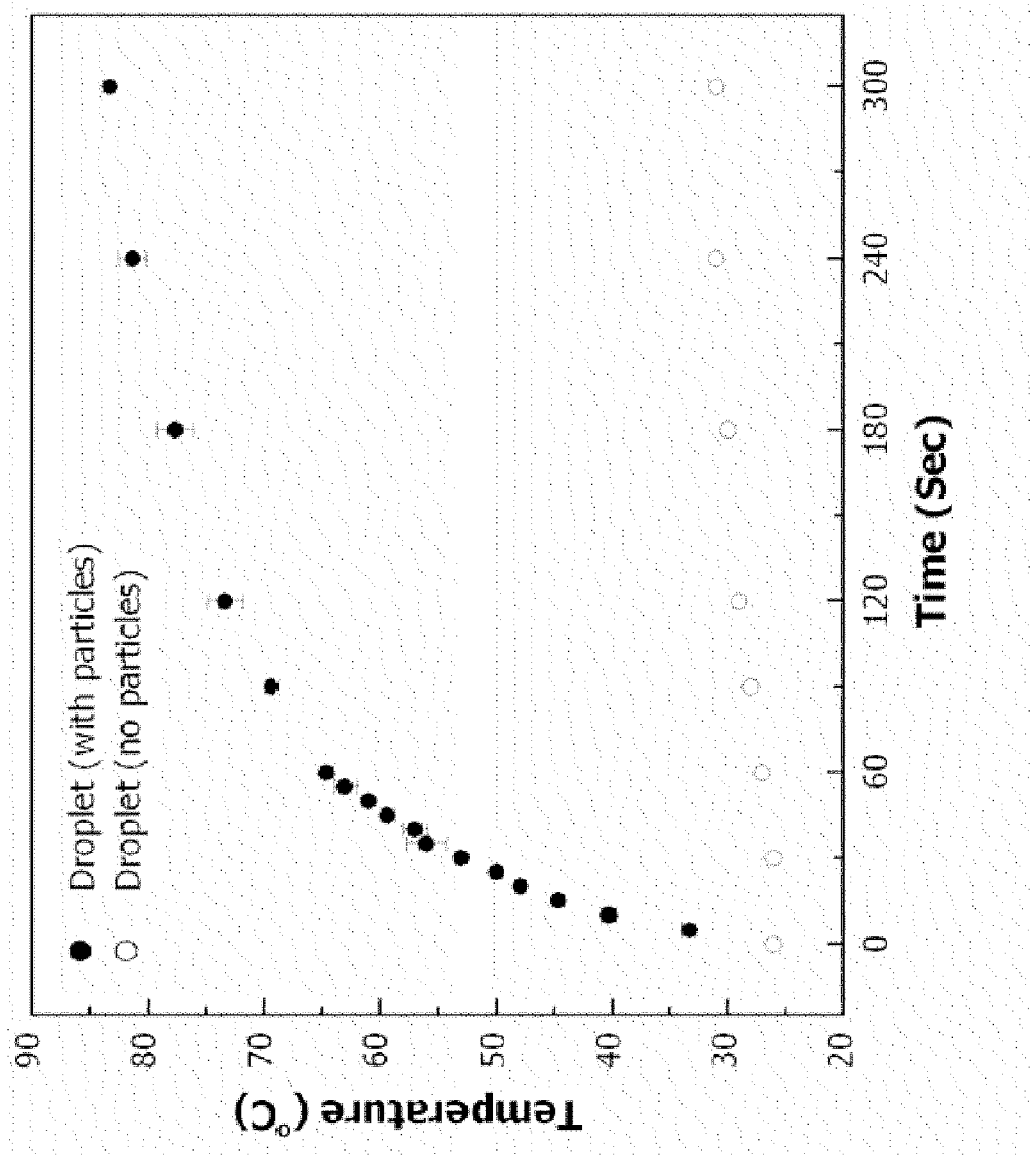
FIG. 7 illustrates droplet temperature vs. heating time for a droplet associated with magnetic porous microparticles.

The magnetite nanoparticles infused within the porous Si microparticles can be heated by application of a radiofrequency electromagnetic field. A discrete aqueous droplet covered with magnetic porous Si microparticles and suspended in mineral oil was heated using a 338 kHz RF field of 3 kW transmitted power. FIG. 7 depicts the temperature of the droplet vs. heating time. For FIG. 7, a 50 µL droplet is placed in mineral oil and heated from 26° C. with an alternating electromagnetic field (3 kW). (●) A droplet covered with magnetic porous Si microparticles; (○) bare droplet (containing no particles). Droplet temperature is measured with a thermocouple probe immediately after the electromagnetic field is turned off. Each data point represents an average of three consecutive measurements. The temperature of the droplet increases from room temperature to 65° C. within 60 s, and a maximum temperature of more than 80° C. is reached after 300 s. At temperatures greater than 80° C., gas bubbles are observed at the surface of the aqueous droplet, suggesting that the temperature in some regions of the droplet has exceeded the boiling point of water. A bare droplet (not covered with magnetic porous Si microparticles) suspended in mineral oil exhibits a temperature increase of only 5° C. after 300 s in the RF field. Similarly, a droplet surrounded by porous Si microparticles that contain little or no magnetite show ~5° C. temperature rise after 300 s in the RF field. These control experiments confirm that the temperature increase in the droplet is largely a result of heat generated in the magnetic porous Si microparticles covering the droplet. The small temperature increase observed in the control experiments can be attributed to resistive (Joule) heating of the coil surrounding the experimental dish and weak inductive heating of water subjected to the alternating electromagnetic field.

The physical mechanism by which the magnetic porous Si particles are heated in the presence of the external alternating electromagnetic field is attributed to Néel relaxational losses that occur upon reorientation of the magnetic moments in the magnetite nanoparticles. Inductive heating of the magnetic particles via eddy currents may be neglected due to the low frequencies used. The amount of heat generated in magnetic materials is strongly dependent on the particle size and microstructure as well as the applied field strength and frequency. The amount of heating that can be obtained by hysteresis losses decreases dramatically as the particle radius decreases below 10 nm, whereas heating due to Neel relaxation becomes significant in this size regime. The ability of the porous Si host to localize high concentrations of magnetite nanoparticles while maintaining their superparamagnetic properties allows heating at relatively low fields.

FIG. 7 depicts the effect of electromagnetic field strength on the droplet heating rate. At several values of coil current, power was applied for 30 s and the droplet temperature was measured immediately afterwards. As expected, the temperature of the droplet increases as the current in the RF coil (directly related to field strength) increases. This effect is more pronounced in the lower current range, where the temperature gradient between the droplet and the surroundings is small.

The time needed to reach the steady-state temperatures in the experiments is somewhat longer than might be considered desirable for microfluidic applications such as thermal cycling in PCR. The slow time to reach steady state is due to heat transfer to the oil (and room air) surrounding the droplet—factors derived from the present experimental setup, which was not optimized for rapid cycling. This can be readily improved by reducing the opportunity for heat transfer. In addition, the thermocouple used to measure temperature had a significant thermal mass relative to the droplet being probed, and so the peak temperatures measured represent somewhat of an under-estimate. Additional factors, such as the amount of magnetic porous Si particles and the volume of oil, also affect the rate of temperature rise and thus can be used to tune the rate and the amount of droplet heating in a given experimental configuration.

Figure 8:
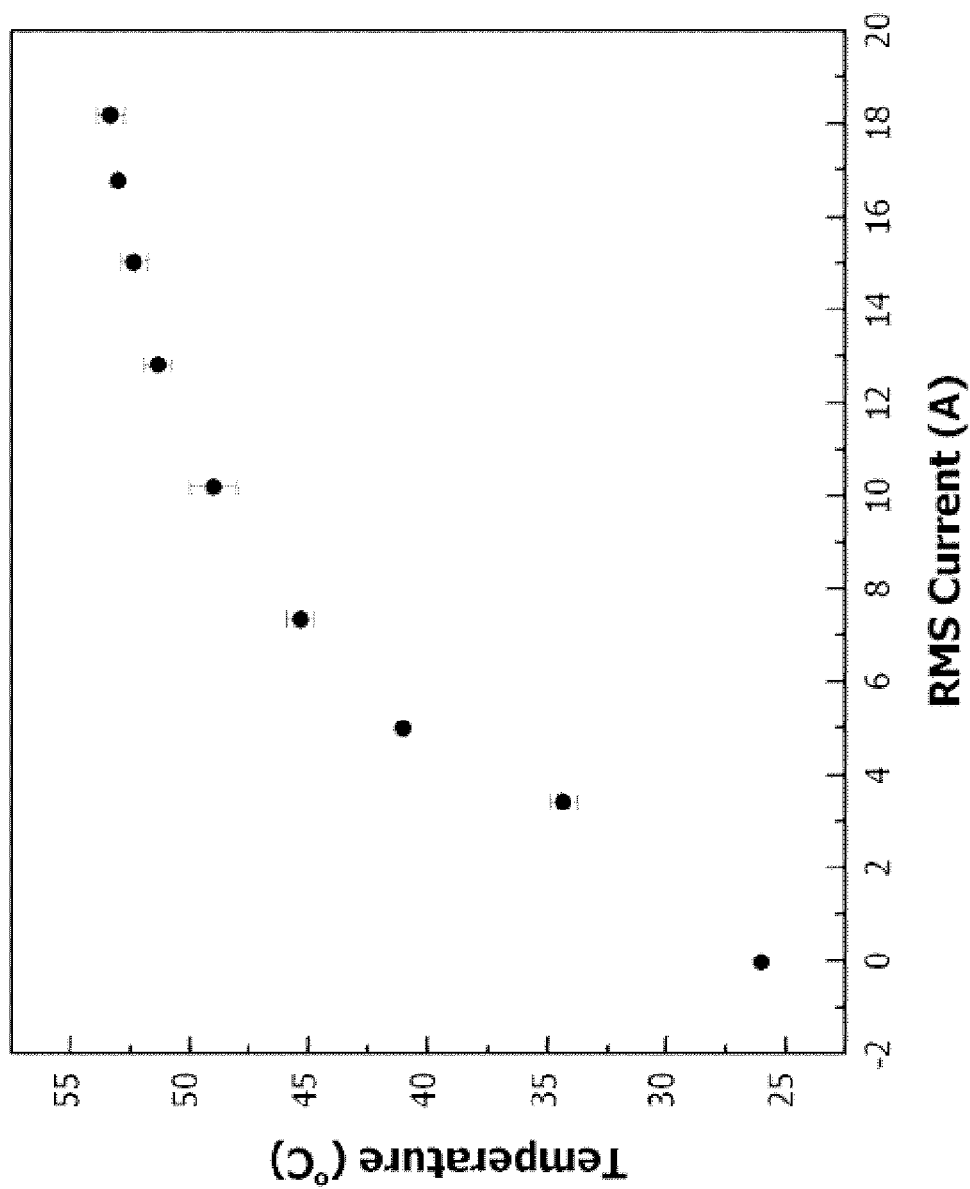
FIG. 8 illustrates droplet temperature vs. RF coil current a droplet associated with magnetic porous microparticles.

For FIG. 8, the 50 µL aqueous droplet covered with magnetic porous Si microparticles is placed in mineral oil and heated from 26° C. with an alternating electromagnetic field for 30 s. Droplet temperature is measured immediately after the electromagnetic field is turned off. Each data point represents an average of three consecutive measurements. The coil current is expressed as the root-mean-square (or RMS) of the current sinusoid.

Fluorescence resonance energy transfer (FRET) relies on the distance-dependent transfer of energy from a donor fluorophore to an acceptor fluorophore. Due to its sensitivity to distance, FRET has been used as a tool for measuring nanometer scale distances and changes in distances, both in vitro and in vivo. The FRET technique is also used in biology as a nano-sized thermo-sensor to observe the heating of small areas by conjugating complementary oligonucleotides with FRET pair fluorophores. This technique takes advantage of the temperature dependence of the reversible hybridization of oligonucleotides. In experiments of the invention complementary DNA strands were end-labeled with the donor-acceptor pair Cy3-Cy5. When allowed to hybridize, the close proximity of the dye molecules allows for FRET to occur, and upon excitation with blue (470 nm) light, red emission from Cy5 at 670 nm is observed. As the solution is heated and the duplex melts, the dyes separate. Emission from Cy3 is then observed at 570 nm, corresponding to a decrease in efficiency of the resonant energy transfer process. The relationship between the Cy5/Cy3 emission intensity ratio and temperature allows the fluorescence spectrum to be used to measure droplet temperature.

Figure 9A:
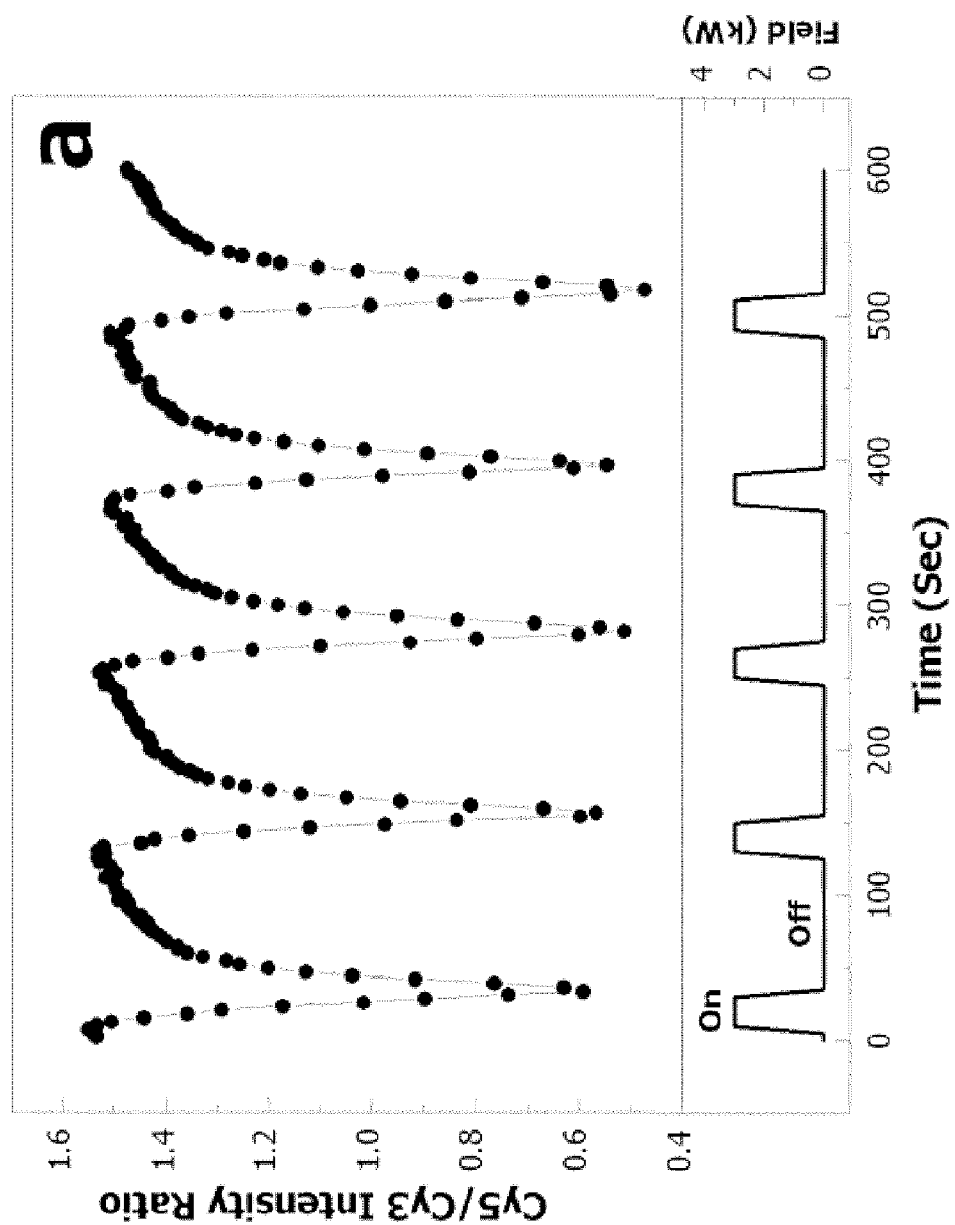
FIG. 9A illustrates change in Cy5/Cy3 fluorescence intensity ratio over five cycles of field application (on: 25 s and off: 95 s)
Figure 9B:
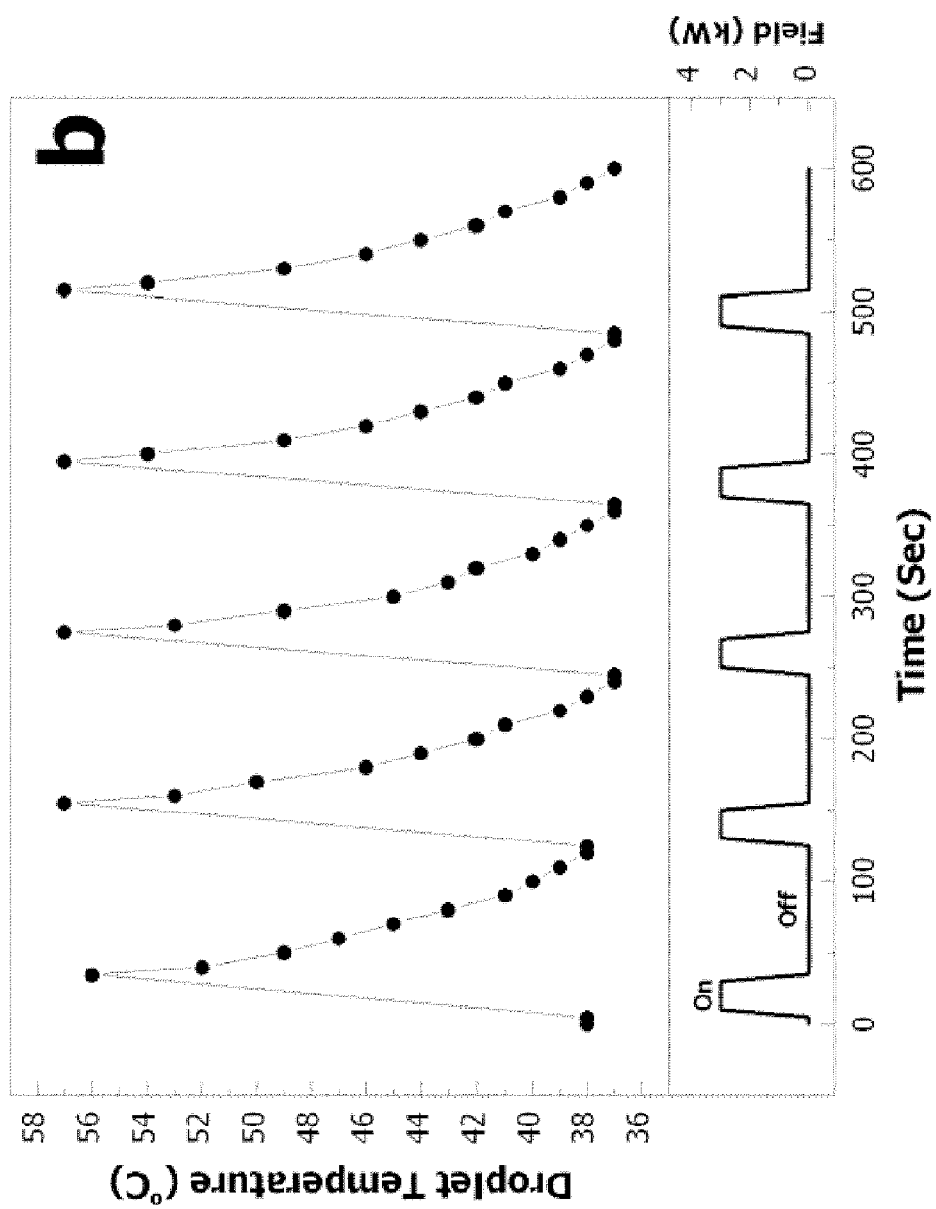
FIG. 9B illustrates droplet temperature change over 5 cycles, measured with a thermocouple probe.

As described above, two droplets containing Cy3- and Cy5-conjugated complementary oligonucleotides were half-covered with magnetic porous Si microparticles. A 50 µL droplet containing 0.6 nmol FRET probe was used. This half-coverage of the droplets by the particles allows better detection of fluorescence changes with the CCD detector. When the two droplets are merged at room temperature, hybridization of complementary oligonucleotides occurs. The merged droplet is then heated by application of an alternating electromagnetic field. The electromagnetic field is switched on for 25 s (5 s elapsed before maximum power was reached), and then off for 95 s. This cycle was repeated five times. The fluorescence spectra of the droplet during the heating process (FIG. 9A) display a change in the Cy5/Cy3 fluorescence intensity ratio with time. The temperature of the droplet was independently monitored by insertion of a thermocouple probe before and after the heating intervals (FIG. 9B). Since the calculated melting temperature of the FRET probe is 46.8° C., the droplet temperature was cycled between 37° C. and 57° C. during the heating/cooling intervals. During heating, the Cy5/Cy3 intensity ratio decreases from a maximum value of 1.5 (at ~37° C.) to a minimum value of ~0.5 (at ~57° C.). The reproducibility of the results during the five consecutive heating/cooling cycles demonstrates that the temperature of the droplet can be precisely controlled and the DNA duplex is durable enough to allow consistent hybridization and de-hybridization transitions in the presence of the magnetic porous Si microparticles. It is possible that some non-specific adsorption of the analytes to the microparticles occurs under the experimental conditions, although no evidence of this was found. The reproducibility of Cy5/Cy3 fluorescence intensity ratio over the five consecutive heating/cooling cycles indicates that non-specific adsorption of the DNA probes, if present, does not significantly impair the assay.

Figure 10:
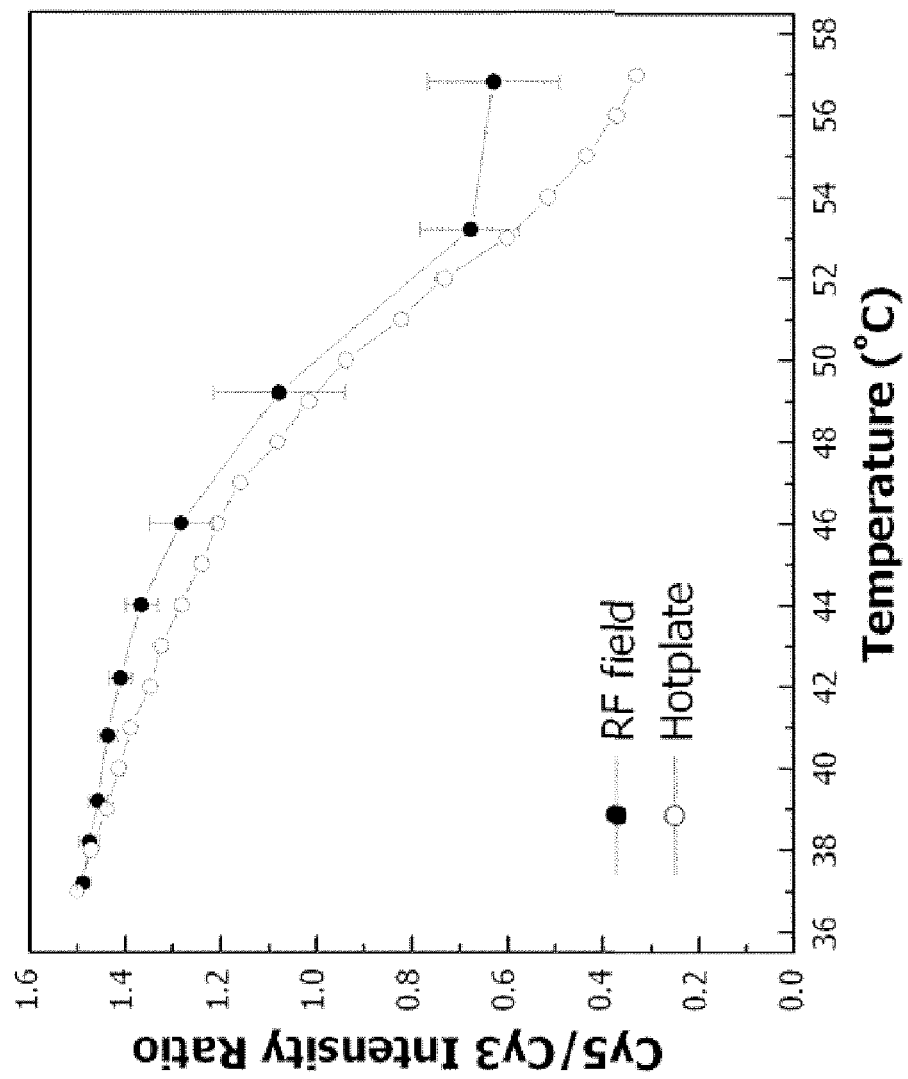
FIG. 10 illustrates Cy5/Cy3 fluorescence intensity ratio during droplet heating for (●) heating achieved by application of RF electromagnetic field and (○) heating achieved with a laboratory hotplate.

The temperature change measured by Cy5/Cy3 fluorescence intensity ratio correlates with the temperature measured with the external thermocouple probe (FIG. 10). Independent measurements on a particle/droplet assembly that was heated with a laboratory hotplate instead of with the RF coil produce the same correlation. With both heating methods, the Cy5/Cy3 fluorescence intensity ratio shows a similar decrease with increasing temperature.

FIG. 10 shows Cy5/Cy3 fluorescence intensity ratio during droplet heating. (●) Heating achieved by application of RF electromagnetic field (○) compared to heating achieved with a laboratory hotplate. RF field data is the average of the five heating/cooling cycles presented in FIGS. 9A and 9B.

The experiments show the feasibility of using encoded magnetic amphiphilic porous Si microparticles to locally heat, manipulate and identify discrete microliter-scale liquid droplets or other associated materials. Associated materials can be heated and moved individually. As the level of heating is related to the amount of microparticles and their degree of magnetization, a group of discrete droplets can be simultaneously heated to different temperatures using a single coil. In addition, the one-dimensional photonic crystal etched into the porous particle provides a unique spectral code to identify a droplet. Thus the approach enables assays to be processed in any desired order in parallel fashion; for example in randomized or combinatorial arrays.

Furthermore, this invention overcomes a requirement of conventional conductive heating schemes—thermal contact between the heating element and reaction vessel. Thus, a chemical reaction requiring temperature control can be remotely actuated. The scheme can be applied in vivo, using extracorporeal application of electromagnetic fields to activate and/or release therapeutic agents from inside a droplet.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for control of associated material, the method comprising steps of:
   providing a porous microparticle with magnetic material within its pores, wherein the porous microparticle comprises multiple porous layers, a first layer containing a spectral code and a second layer hosting the magnetic material;
   infusing the associated material into the pores of the second layer;
   with an external magnetic field, controlling the porous microparticle to thereby control the associated material.

2. The method of claim 1, wherein said step of controlling comprises applying an AC radio frequency electromagnetic field to heat the porous microparticles and thereby heat the associated material.

3. The method of claim 2, further comprising adhering the porous microparticle to an aqueous droplet.

4. The method of claim 1, wherein said step of controlling comprises applying a DC magnetic field to move the porous microparticle and thereby move the associated material.

5. The method of claim 4, further comprising a step of adhering the porous microparticle to an aqueous droplet prior to said step of controlling.

6. A magnetic porous particle, comprising:
   a host layer having pores sized to accept magnetic nanoparticles;
   magnetic nanoparticles infused within pores of the host layer;
   an encoding layer having pores that define a spectral code, the pores in the encoding layer being sized to substantially exclude the magnetic nanoparticles.

7. The particle of claim 6, wherein the encoding layer comprises multiple layers that exhibit a complex spectral code.

8. The particle of claim 6, wherein the magnetic nanoparticles comprise superparamagnetic nanoparticles.

9. The particle of claim 6, wherein the pores of the encoding layer are sized to accept infusion of an associated material smaller than the magnetic nanoparticles.

10. The particle of claim 6, wherein the host layer and the encoding layer comprise porous silicon.

11. The particle of claim 6, wherein the encoding layer comprises a photonic crystal with a predetermined spectral code.

12. The particle of claim 6, wherein the encoding layer is hydrophobic, with surface-grafted dodecyl moieties.

13. The particle of claim 12, wherein the host layer comprises a hydrophilic oxide host layer and the magnetic nanoparticles comprise $Fe_3O_4$ nanoparticles.

14. The particle of claim 6, wherein the particle is micron sized.

15. The particle of claim 6, incorporated into a host.

16. The particle of claim 15, wherein the host comprises one of a test kit, assay, power, paste, liquid, glass, and paper.

17. The particle of claim 6, further comprising a specific antibody, oligonucleotide or ligand to provide affinity for a specific antigen, oligonucleotide, or receptor.

18. The particle of claim 6, wherein the magnetic nanoparticles comprise rare earth magnetic materials, gadolinium, or nickel.

19. The particle of claim 6, wherein a size of the particle is 150~200 μm.

20. The particle of claim 6, adhered to a droplet.

21. The method of claim 1, further comprising adhering a plurality of microparticles to a droplet.

22. The method of claim 21, wherein the droplet comprises oligonucleotides.

23. The method of claim 21, wherein said adhering comprises adhering the plurality of microparticles to a plurality of droplets that comprise oligonucleotides, the method further comprising using the external magnetic field to move the droplets together and merge the droplets.

24. The method of claim 1, wherein said controlling comprises moving the microparticle and the associated material.

* * * * *

UNITED STATES PATENT AND TRADEMARK OFFICE
CERTIFICATE OF CORRECTION

PATENT NO. : 8,377,147 B2  
APPLICATION NO. : 12/300369  
DATED : February 19, 2013  
INVENTOR(S) : Sailor et al.

Page 1 of 1

It is certified that error appears in the above-identified patent and that said Letters Patent is hereby corrected as shown below:

In the Specification:

Col. 3, line 19    Before "exclude" please delete "substantial" and insert --substantially-- therefor.

Signed and Sealed this
Thirtieth Day of July, 2013

Teresa Stanek Rea
*Acting Director of the United States Patent and Trademark Office*